June 21, 1955     A. SCHOENWALD     2,711,470
HANDLE AND SWITCH APPARATUS FOR ELECTRIC TOOLS
Filed May 15, 1953

INVENTOR.
ALEXANDER SCHOENWALD
BY Archworth Martin
his ATTORNEY.

United States Patent Office 2,711,470
Patented June 21, 1955

2,711,470

HANDLE AND SWITCH APPARATUS FOR ELECTRIC TOOLS

Alexander Schoenwald, Grove City, Pa., assignor to P. Wall Mfg. Co., Grove City, Pa., a corporation of Pennsylvania Application May 15, 1953, Serial No. 355,287

2 Claims. (Cl. 219—26)

This invention relates to handle and control switch apparatus that is particularly suitable for use in connection with electrically-heated tools such as soldering irons. Certain features shown herein are shown and described also in my co-pending application Serial No. 355,288, filed May 15, 1953, now abandoned.

One object of my invention is to provide a handle and switch mechanism of simple and compact form by the use of which an electrically-heated soldering iron or the like can conveniently be manipulated and the supply of electrical heating current thereto be conveniently controlled.

Another object of my invention is to provide an improved manner of connecting a soldering iron and its holder or chuck to a handle and switch structure.

Still another object of my invention is to provide a handle and switch structure so arranged that the parts can readily be opened for replacements and repairs.

Figure 1:
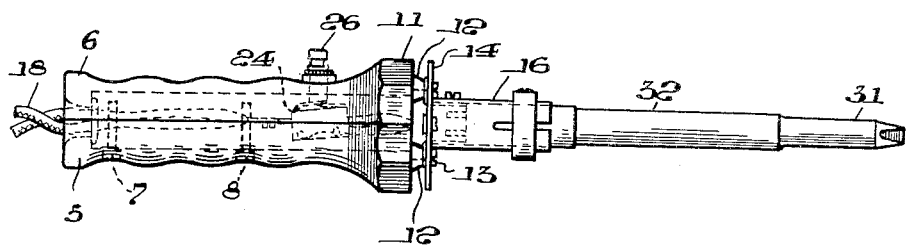
Figure 2:
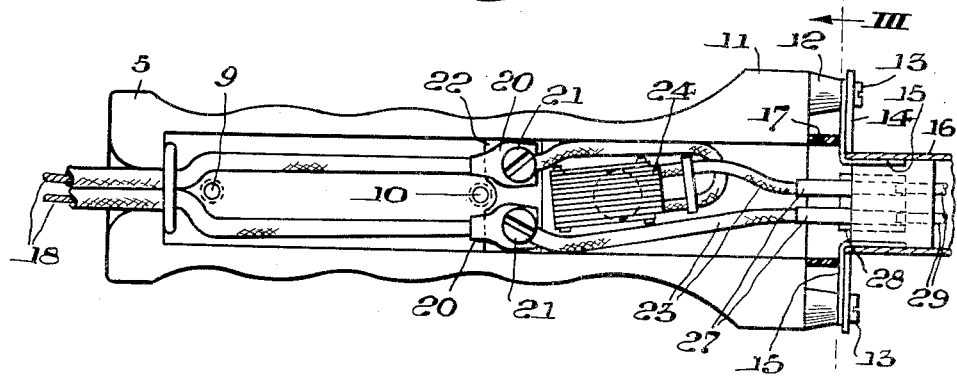
Figure 3:
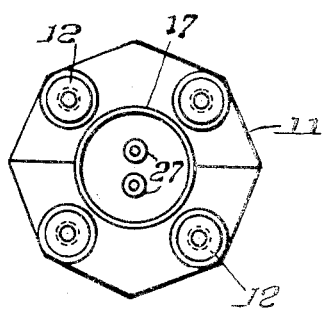

In the accompanying drawing, Figure 1 is a side view of the apparatus, with an electrically-heated soldering iron in place thereon;

Fig. 2 is a sectional plan view, on an enlarged scale, of a portion of the structure of Fig. 1, and Fig. 3 is a view taken on the line III—III of Fig. 2.

The handle structure comprises two grip members 5 and 6 of molded insulating material and releasably connected together by screws 7 and 8 that extend through the handle portion 5 and into tapped holes 9 and 10 respectively, of the handle portion 6. The forward ends of the members 5 and 6 each have portions of a head 11 formed thereon. Stud-like extensions 12 are molded integrally with the handle members and the head 11, and have tapped holes to receive screws 13. The screws 13 extend through a base plate 14 and through attaching strips 15 that are welded to a chuck body 16, to detachably hold the chuck body on the handle 5—6. An insulating ring 17 is interposed between the angled strips 15 and the head 11.

Conductor wires 18 extend into the handle and, at their forward ends, have terminals 20 that are connected to the handle member 5 by screws 21 which extend into tapped holes in a rib 22 that is molded integrally with the member 5, and serves as a terminal block.

The screws 21 serve also as terminal screws for connecting conductors 23 to the terminal plates 20. One of the conductors 23 has a switch 24 of the push-button type incorporated therein, the switch being operated by a push-button 26 that is convenient to the thumb of the operator when using the tool.

The forward bared ends of the wires 23 fit into conductor tubes 27 that are firmly mounted in a block 28 of insulating material and which is, in turn, fitted tightly within the chuck body 16. Terminal pins 29 have telescopic fit with the tubes 27 and are connected at the forward ends, through suitable wiring, to resistor elements in the soldering tip 31 in the manner shown for example in my application Serial No. 280,242, filed April 3, 1952, now Patent No. 2,667,561. Other forms of heating elements or welding tips can, of course, be used as for example the type of tip shown in my application Serial No. 330,989, filed January 13, 1953, now abandoned. The tip 31 has the usual shank portion or base portion 32 that is detachably connected to the chuck 16.

Upon loosening of the chuck, the tip, together with its studs 29, can be withdrawn from the handle and another tip substituted therefor.

I claim as my invention:

1. A holder for electrically-heated soldering irons and the like, comprising a handle of hollow form and having tapped studs projecting forwardly from its front end, a terminal block within the handle, conductors extending into the rear end of the handle and connected to the terminal block, other conductors electrically connected to the first-named conductors and extending forwardly beyond the handle, terminal members on the forward ends of the second-named conductors, in position for engagement by terminals of a soldering iron, a block supporting the said terminals, a tubular chuck body rigidly fitting around the block and having radially-extending supporting strips engageable with said studs, a clamping plate surrounding the chuck, attaching screws extending through the plate and the said strips and having threaded engagement with the studs, and a protecting ring coaxial with the chuck, in surrounding relationship to the said terminals, held clamped between the forward end of the handle and the said strips and plate.

2. A holder for electrically-heated soldering irons and the like, comprising a handle of hollow form and having tapped studs projecting forwardly from its front end, a terminal block within the handle, conductors extending into the rear end of the handle and connected to the terminal block, other conductors electrically connected to the first-named conductors and extending forwardly beyond the handle, terminal members on the forward ends of the second-named conductors, in position for engagement by terminals of a soldering iron, a block supporting the said terminals, a tubular chuck body rigidly fitting around the block and having radially-extending supporting strips engageable with said studs, a clamping plate surrounding the chuck, attaching screws extending through the plate and the said strips and having threaded engagement with the studs, and a switch carried by the first-named block and having a pushbutton protruding from the handle, for making and breaking the circuit through one of the conductors.

References Cited in the file of this patent

UNITED STATES PATENTS

| 1,909,774 | Lindsay | May 16, 1933 |
|---|---|---|
| 2,014,567 | Hazlett et al. | Sept. 17, 1935 |
| 2,114,703 | Conner | Apr. 19, 1938 |
| 2,167,389 | Kuhn et al. | July 25, 1939 |
| 2,257,376 | Grey | Sept. 30, 1941 |
| 2,533,749 | Young | Dec. 12, 1950 |
| 2,554,926 | Schoenwald | May 29, 1951 |

FOREIGN PATENTS

| 646,139 | Great Britain | Nov. 15, 1950 |